Jan. 7, 1964

D. R. McNEAL 3,116,755

MEANS FOR SIMULTANEOUSLY ACTUATING PLUG
VALVES IN A DUPLEX STRAINER

Filed Sept. 6, 1961

INVENTOR
DANIEL RAYMOND McNEAL
BY
Synnestvedt & Lechner
ATTORNEYS

Jan. 7, 1964  D. R. McNEAL  3,116,755
MEANS FOR SIMULTANEOUSLY ACTUATING PLUG
VALVES IN A DUPLEX STRAINER
Filed Sept. 6, 1961  2 Sheets-Sheet 2

INVENTOR
DANIEL RAYMOND McNEAL
BY
Symmestvedt & Lechner
ATTORNEYS

United States Patent Office 3,116,755
Patented Jan. 7, 1964

3,116,755
MEANS FOR SIMULTANEOUSLY ACTUATING PLUG VALVES IN A DUPLEX STRAINER
Daniel Raymond McNeal, Rydal, Pa., assignor to Andale Company, Philadelphia, Pa., a corporation of Pennsylvania
Filed Sept. 6, 1961, Ser. No. 137,473
4 Claims. (Cl. 137—601)

My invention relates to duplex strainers of the plug valve type. The strainer is of the general type shown in the patent to Jenkins, No. 2,921,687, but instead of using disc valves as disclosed in that patent I provide in my present invention for the use of two tapered plug valves which are operated simultaneously by a single operating device to control the flow of fluid through the strainer.

Heretofore it has been found to be difficult to operate tapered plug valves manually in a strainer of the type illustrated in the drawings where the valves are subjected to relatively high internal fluid pressure because of the friction between the movable parts and the stationary parts of the valve. It has heretofore been the practice to lift the plug valve slightly from the seat by means of a lifting lever and after the valve has been lifted to turn the valve by means of a separate turning lever to switch the flow of fluid through the strainer from one chamber to the other.

In the single plug valve type of construction the lifting of the plug valve from its seat has the additional disadvantage that this lifting is apt to produce complications such as leakage of the unstrained oil into the strained oil side of the valve. The use of separate plugs for the strained and unstrained oil avoids this difficulty.

It is an object of my invention to provide a duplex strainer with a pair of plug valves having one operating rod which effects both the lifting and turning of the valves when the flow of fluid through the strainer is to be switched from one straining compartment to the other.

It is a further object of my invention to provide for a duplex strainer a plug valve operating member which will prevent unseating of the plug valves by a reverse pressure of fluid in the strainer.

The invention is illustrated in preferred form in the accompanying drawings wherein.

Figure 2:
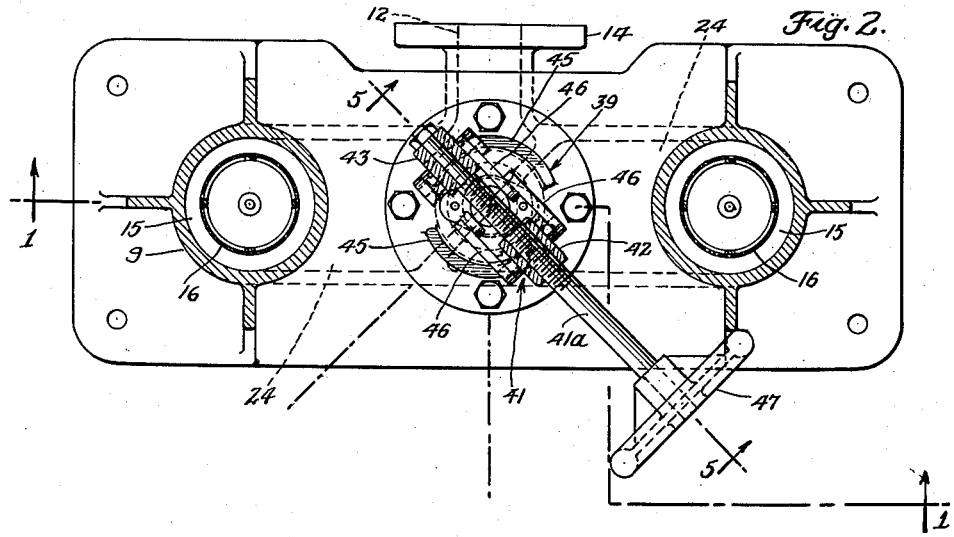
FIGURE 2 is a plan section taken on the line 2—2 of FIGURE 3.
Figure 1:
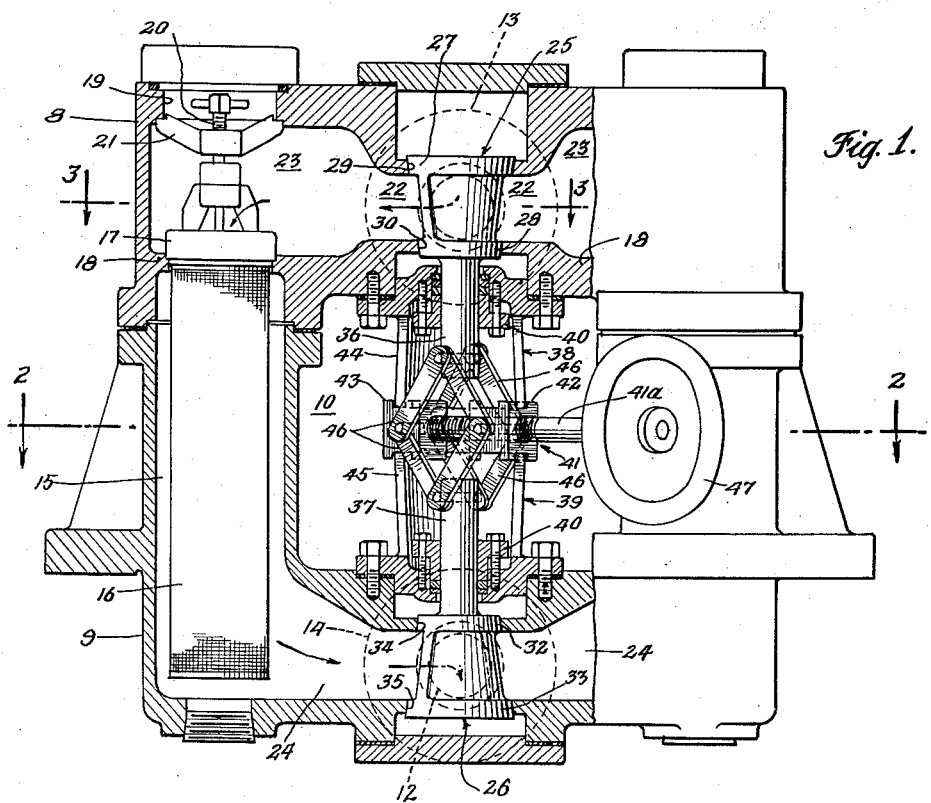
FIGURE 1 is a sectional elevational view as taken on the line 1—1 of FIGURE 2.
Figure 5:
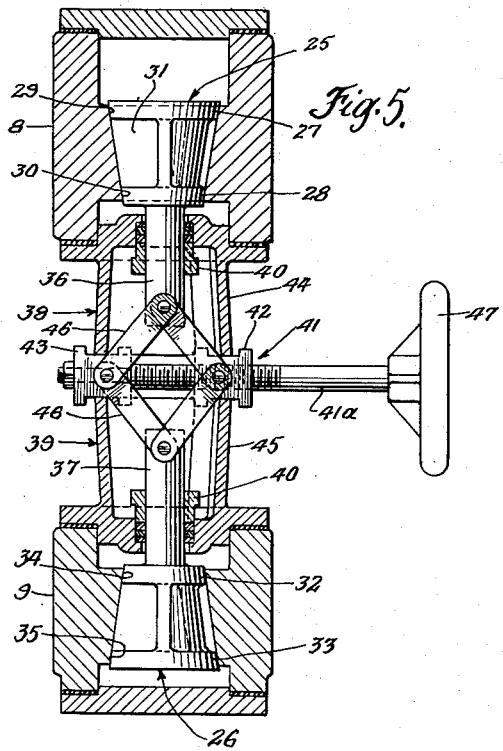
FIGURE 5 is a sectional view taken on the line 5—5 of FIGURE 2.

Referring to the drawings and initially to FIGURE 1, a duplex stainer is illustrated with the valves in position to direct the flow of fluid through the left strainer chamber. The strainer consists primarily of an upper body portion 8 and a lower body portion 9, these two body portions being suitably formed and secured together to provide a central space 10 in which the valve operating mechanism is disposed.

The upper body portion 8 is provided with a fluid inlet chamber 11 and the lower body portion is provided with an outlet chamber 12. The openings to the chambers are surrounded by connection flanges 13 and 14 which are connected respectively to a supply conduit and delivery conduit which are not shown on the drawings.

The inlet and outlet chambers and the connecting openings are in substantial vertical alignment as shown in FIGURE 1. At each side of the body of the valve is formed to provide strainers receiving chambers 15—15 in which basket type screen strainers or filtering cartridges 16—16 are fitted. These strainers are provided at the upper end with collars 17 which rest on internal web members 18 of the upper body portion 8. The strainers 16—16 are inserted and withdrawn through openings 19 in the top wall of the upper body portion 8. The collars are pressed against the webs 18 by means of a screw threaded rod 20 which is threaded into a yoke 21 which bears against the under surface of the top wall of the upper body portion 8 below the opening 19. By this arrangement and filtering cartridges are thoroughly and firmly seated and held in seated position. In describing these parts of the valve it will be understood that the straining compartments, the screen strainers and the parts associated with them are the same on both sides of the strainer although only one side is shown in section in FIGURE 1.

A passageway 22 connects the upper chamber 23 formed by the web 18 with the inlet chamber 11 and passageway 24 connects the strainer chamber 15 with the outlet chamber 12.

Figures 3, 4, 7:
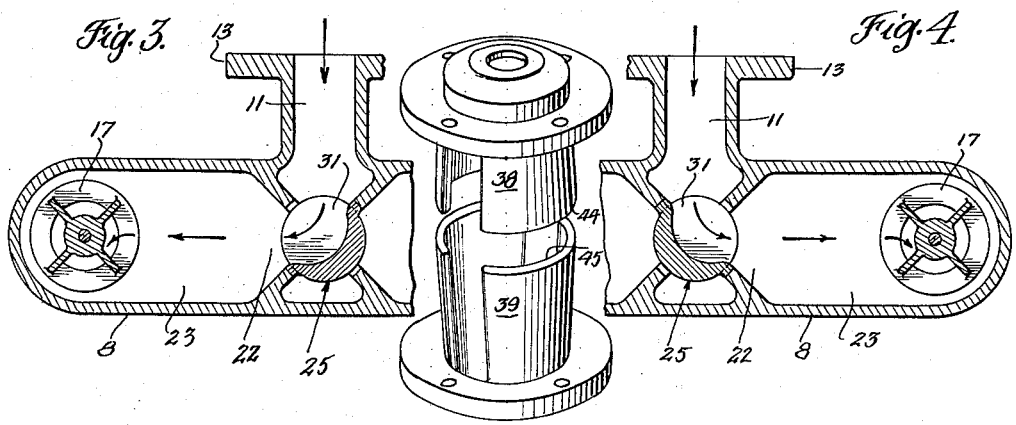
FIGURE 3 is a fragmentary plan section taken on the line 3—3 of FIGURE 1.
FIGURE 4 is a view similar to FIGURE 3, but showing the valve in position for right strainer operation.
FIGURE 7 is an isomeric view of the supporting yokes.

For controlling and directing the flow of the fluid to be strained through the screen strainer 16, two plug valves are provided, the upper plug valve 25 and the lower plug valve 26. The upper plug valve has two tapered valve discs 27 and 28 which are spaced apart to coact respectively with the complemenetarily tapered seats 29 and 30 of the valve bore in the upper body portion 8. The seat 29 is formed in the top part of the bore and the seat 30 is formed in the bottom part of the bore. The plug valve has a lateral passageway 31, FIGURES 3–6, for selectively establishing communication between the inlet chamber 11 and the right or left hand passageways 22 which lead to the upper chambers 23 of the right and left hand strainers. As shown in FIGURES 1 and 3, the left hand strainer is in operation and as shown in FIGURE 4, the right hand strainer is operating.

The construction of the lower plug valve 26 is like that of the upper valve, but one is inverted with respect to the other. The lower valve has upper and lower valve discs 32—33 which coact with valve seats 34—35 and a lateral passageway which connects lower passageways 24—24 of the strainer compartment with the outlet chamber 12.

Both of the plug valves 25 and 26 are formed integrally with valve stems 36 and 37 respectively which project into the central space 10 through packing glands carried by upper and lower supporting yokes 38, 39.

The yokes are secured to the upper and lower body portions of the valve within the central space 10 and carry packing glands 40—40 for the packing which surrounds the valve stems. The valves and valve stems are in axial alignment and are operated simultaneously by the operating device 41, first to lift the plug valves slightly from their seats and next to turn the valves to switch the flow of fluid through the strainer from one straining compartment to the other.

This movement of the plug valves is effected by a spindle and toggle mechanism which is mounted between and supported by the upper and lower supporting yokes 38—39. This mechanism comprises two blocks 42 and 43 which are slidably supported by the arcuate legs 44 of the upper yoke 38 and 45 of the lower yoke 39. The block 42 has a fine threaded opening which is adapted to receive and cooperate with the fine threaded portion of the operating rod 41a. The end of the rod 41a fits into and is supported in an unthreaded opening in the block or pall 43. The toggle links 46—46 are connected to pins which extend from opposite sides of the upper and lower valve stems 36—37 and to pins which extend from opposite sides of the blocks 42—43.

Figure 6:
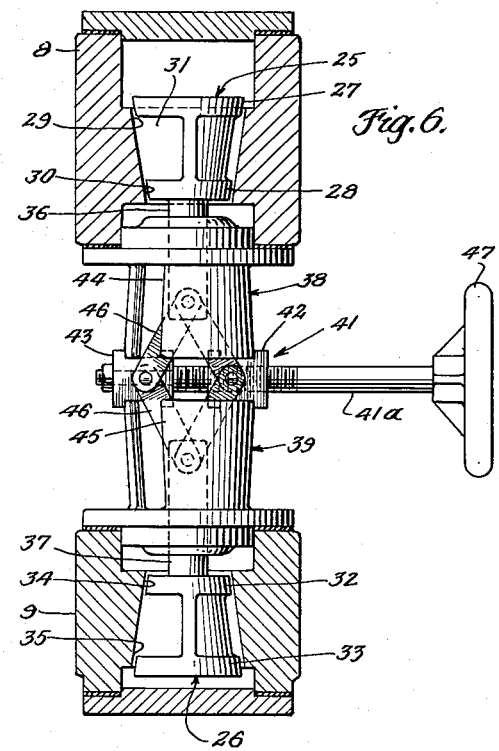
FIGURE 6 is a view similar to FIGURE 5, but showing the plug valves eased off their seats.

A hand wheel 47 is connected to the end of operating rod 41a. It will be apparent that by turning this hand wheel, the rod 41a will pull together or spread apart the blocks 42 and 43 and this movement is converted to an up and down motion through the linkage of the toggle. A slight rotation of the hand wheel 47 (just a few degrees) will move the valve stems 36 and 37 and their associated plug valves 25 and 26 outwardly, i.e., away from the valve seats (as shown in FIGURE 6) and will permit the operating rod 41a to swing the valve stems and their associated valves through an arc of 90° to switch the flow of fluid from one straining chamber to the other. When the valves have been moved through the arc of 90°, the rotation of the hand wheel and operating rod in the reverse direction will bring the valve stems and associated valves inwardly, to reseat the valves on their seats, as shown in FIGURE 4. Due to the fine threading of the rod 41a and the block 42 reverse pressure on the valves will not be able to overcome the friction between the threads on the lever and block and unseating of the valves is thereby prevented.

The directional arrows on FIGURES 1 and 3 indicate the flow of fluid through the left hand strainer when the hand wheel and associated parts are in the right hand position shown in these figures. The flow in right hand strainer operation is indicated in FIGURE 4 when the hand wheel and associated parts have been moved through an arc of 90° to the left hand position.

Although I have illustrated a unit in which the flow takes place from the inlet chamber to the inside of the screen strainer and then out through the screen to the outlet chamber, it is obvious that a unit could be built so that the flow could take place in the opposite direction; namely, from the inlet chamber to the outside of the screen strainer and then into the interior thereof and thence to the outlet chamber.

From the foregoing description it will be apparent that in my improved strainer I have eliminated the need for a separate lifting and turning lever for the valves. When the use of two separate plug valves has been attempted the problem has been compounded. My improvement has solved these difficulties in a practical and effective manner.

I claim:

1. A valve assembly for a duplex strainer having a fluid inlet chamber and a fluid outlet chamber, a strainer compartment on each side of said chambers, a passageway connecting each strainer compartment with the inlet chamber, and a passageway connecting each strainer compartment with the outlet chamber comprising, a tapered plug valve having passages therethrough for controlling the inlet passageway and a separate tapered plug valve having passages therethrough for controlling the outlet passageways, valve seats for each valve, a separate valve stem for each valve, said valve stems extending to the exterior of the valve body, and common actuating means disposed between said passageway and said valve stems comprising means to move the valve stems and their associated valves axially in opposite directions toward and away from the valve seats, and to rotate the valve stems and their associated valves when the valves are in unseated position to switch the flow of fluid from the strainer passageways of one compartment to the strainer passageways of the other compartment.

2. A valve assembly for a duplex strainer having a fluid inlet chamber and a fluid outlet chamber, a strainer compartment on each side of said chambers, a passageway connecting each strainer compartment with the inlet chamber, and a passageway connecting each strainer compartment with the outlet chamber comprising, a tapered plug valve having passages therethrough for controlling the inlet passageways and a separate tapered plug valve having passages therethrough for controlling the outlet passageways, valve seats for each valve, a separate valve stem for each valve, said valve stems extending to the exterior of the valve body and common actuating means disposed between said passageway and said valve stems for simultaneously actuating said valve stems and their associated valves comprising an operating rod and means associated with said rod and said valve stems adapted to move the valve stems and their associated valves axially in opposite directions toward and away from the valve seats on rotation of said rod and to turn the valves on swinging movement of said rod.

3. A valve assembly for a duplex strainer having a fluid inlet chamber and a fluid outlet chamber, a strainer compartment on each side of said chambers, a passageway connecting each strainer compartment with the inlet chamber, and a passageway connecting each strainer compartment with the outlet chamber comprising, a tapered plug valve having passages therethrough for controlling the inlet passageways and a separate tapered plug valve having passages therethrough for controlling the outlet passageways, valve seats for each valve, a separate valve stem for each valve, said valve stems extending to the exterior of the valve body and common actuating means between said passageway and said valve stems comprising a toggle mechanism, means to support said toggle mechanism for swinging movement, means connecting said toggle mechanism with the valve stems, an operating rod associated with said toggle mechanism, said toggle mechanism being constructed and arranged to move the valve stems and their associated valves in opposite directions and toward and away from the valve seats on rotation of said rod and to turn the valve stems and their associated valves on swinging movement of said rod.

4. A valve assembly for a strainer according to claim 3 wherein the toggle includes a screw threaded block member and a cooperating screw threaded rod member and links connecting said block to the valve stems, the pitch of the threads on the block and rod being such that reverse pressure on the valves will not move the toggle member.

References Cited in the file of this patent

UNITED STATES PATENTS

| | | |
|---|---|---|
| 1,288,257 | Stewart | Dec. 17, 1918 |
| 2,031,614 | McKee | Feb. 25, 1936 |
| 2,532,177 | Maunula | Nov. 28, 1950 |
| 2,626,774 | Palmer | Jan. 27, 1953 |
| 2,661,845 | Sullivan | Dec. 8, 1953 |
| 2,705,609 | Prescott | Apr. 5, 1955 |
| 2,893,681 | McNeal | July 7, 1959 |
| 2,921,687 | Jenkins | Jan. 19, 1960 |

FOREIGN PATENTS

| | | |
|---|---|---|
| 647,981 | Germany | July 17, 1937 |

UNITED STATES PATENT OFFICE
CERTIFICATE OF CORRECTION

Patent No. 3,116,755 January 7, 1964

Daniel Raymond McNeal

It is hereby certified that error appears in the above numbered patent requiring correction and that the said Letters Patent should read as corrected below.

Column 1, line 57, for "isomeric" read -- isometric --; column 2, line 3, strike out "of", first occurrence; line 15, for "and" read -- the --.

Signed and sealed this 30th day of June 1964

(SEAL)
Attest:

ERNEST W. SWIDER
Attesting Officer

EDWARD J. BRENNER
Commissioner of Patents